(12) United States Patent
Ichinose et al.

(10) Patent No.: US 8,504,202 B2
(45) Date of Patent: Aug. 6, 2013

(54) AUTONOMOUS MOBILE ROBOT APPARATUS AND A RUSH-OUT COLLISION AVOIDANCE METHOD IN THE SAME APPARATUS

(75) Inventors: Ryoko Ichinose, Tsukuba (JP); Saku Egawa, Toride (JP); Yuji Hosoda, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 1015 days.

(21) Appl. No.: 12/547,666

(22) Filed: Aug. 26, 2009

(65) Prior Publication Data
US 2010/0222954 A1    Sep. 2, 2010

(30) Foreign Application Priority Data
Aug. 29, 2008    (JP) .................................. 2008-221722

(51) Int. Cl.
| | |
|---|---|
| G05B 19/18 | (2006.01) |
| G05B 19/4061 | (2006.01) |
| G05D 1/00 | (2006.01) |
| G08G 1/16 | (2006.01) |

(52) U.S. Cl.
USPC ............... 700/255; 700/253; 701/26; 701/23; 701/301; 901/2

(58) Field of Classification Search
USPC ............. 701/301, 300, 23, 26, 302; 700/255, 700/245, 253; 318/568.12, 568.18; 901/2
See application file for complete search history.

(56) References Cited

U.S. PATENT DOCUMENTS
7,881,868 B2 * 2/2011 Greene et al. ................. 701/301
8,090,537 B2 * 1/2012 Nishira et al. ................. 701/301
(Continued)

FOREIGN PATENT DOCUMENTS
| JP | 09-185412 | 7/1997 |
|---|---|---|
| JP | 2001-266123 | 9/2001 |
| JP | 2006-260217 | 9/2006 |
| JP | 2008-065755 | 3/2008 |
| JP | 2009-217330 | 9/2009 |
| JP | 2009-294934 | 12/2009 |

OTHER PUBLICATIONS

Machine generated English translation of JP2006-260217. Foreign reference provided by applicant.*

*Primary Examiner* — Christine Behncke
(74) *Attorney, Agent, or Firm* — Antonelli, Terry, Stout & Kraus, LLP.

(57) ABSTRACT

An autonomous mobile robot apparatus and a method for avoiding collision due to rush-out, being applicable under the circumstances where persons and robots come and go each other, comprises an obstacle detector unit 3, which detects an obstacle, a route producer unit 7, which determines a route for reaching to a destination while avoiding the obstacle detected by the obstacle detector unit upon basis of a predetermined avoiding method, as well as, a velocity thereof, and a moving unit 2, which loads the obstacle detector unit and the route producer unit thereon and moves, thereby operating under circumstances mixing with a human being(s), wherein the obstacle detector unit, further, detects a terminal point of an article lying in an advancing direction of the autonomous mobile robot apparatus, and a distance between the terminal point and the autonomous mobile robot apparatus, and the route producer unit, when the obstacle detector unit detects the terminal end of said article, controls at least either one of the route and the velocity thereof, so as to avoid to collide on the obstacle, which rushes out from the terminal point, in the advancing direction of the autonomous mobile robot apparatus, centering around said terminal point, and thereby enabling quick movement while avoiding collision due to rush-out.

2 Claims, 15 Drawing Sheets

(56) References Cited

U.S. PATENT DOCUMENTS

| | | | |
|---|---|---|---|
| 2001/0024514 A1* | 9/2001 | Matsunaga | 382/106 |
| 2003/0067219 A1* | 4/2003 | Seto et al. | 303/193 |
| 2007/0288133 A1* | 12/2007 | Nishira et al. | 701/23 |
| 2008/0040040 A1* | 2/2008 | Goto et al. | 701/301 |
| 2008/0097699 A1* | 4/2008 | Ono | 701/300 |

* cited by examiner

FIG.5

| AVOIDING CAPACITY | |
|---|---|
| AVOIDING DIRECTION | CHANGING DIRECTION TO PRESENT ADVANCING DIRECTION |
| | PASS THROUGH RIGHT-HAND SIDE OR LEFT-HAND SIDE |
| POSITION INFORMATION | |
| INDIVIDUAL IDENTITY INFORMATION (UNIQUE NUMBER) | |
| NOTICE TIME | |
| PRESENCE/POSITION OF COMPANION(S) | |
| PASSING INHIBITED DIRECTION | |
| OBSTACLE DETECTION INFORMATION | |

FIG.9

|  |  | OBSTACLE | | |
|---|---|---|---|---|
|  |  | AVOIDING CAPACITY HIGH | AVOIDING CAPACITY LOW | NO AVOIDING METHOD INFORMATION |
| ONESELF | AVOIDING CAPACITY HIGH | AVOIDING METHOD B GIVE PRIORITY TO EITHER ONE AVOIDING METHOD | AVOIDING METHOD B GIVE PRIORITY TO AVOIDING METHOD OF OBSTACLE | AVOIDING METHOD A |
| | AVOIDING CAPACITY LOW | AVOIDING METHOD B GIVE PRIORITY TO AVOIDING METHOD OF ONESELF | AVOIDING METHOD B GIVE PRIORITY TO EITHER ONE AVOIDING METHOD | AVOIDING METHOD A |

FIG.10

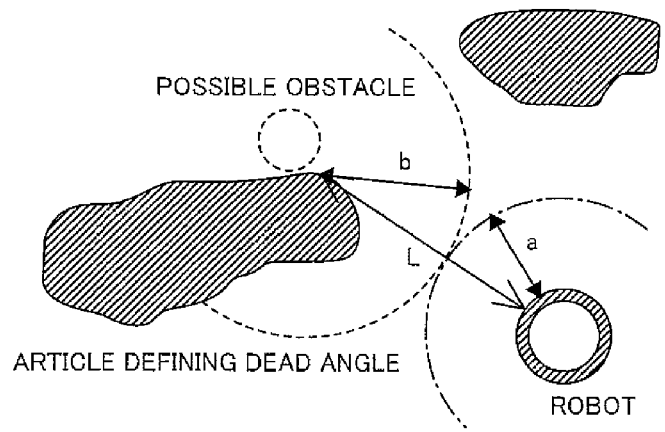

AVOID
(TAKE LONG WAY AROUND)

ROUTE

DECELERATE

ROUTE

AUTONOMOUS MOBILE ROBOT APPARATUS AND A RUSH-OUT COLLISION AVOIDANCE METHOD IN THE SAME APPARATUS

BACKGROUND OF THE INVENTION

The present invention relates to an autonomous mobile robot apparatus, which can smoothly moves within traffic of humans and/or robots, and it also relates to a method for avoiding from rush-out collision thereof.

In recent years, differing from the conventional industrial robots, a large number of developments are made on robots to be utilized in a life of a human being or person, such as, an office robot, a pet robot, etc. Those robots, not provided fixedly, but conduct jobs, such as, a guidance job, a carrying job, and/or a guard job, etc., while autonomously moving around within a house or an office. When they move around, autonomously, they must move without colliding on a person and/or articles, for the safety thereof.

Conventionally, with provision of means for detecting the person and/or articles, for example, an ultrasonic sensor and/or a laser radar, etc., a route is changed to take a long way around an obstacle when detecting that obstacle, such as, the person and/or articles, for example, in a short distance. However, there is a possibility that a moving obstacle, as well as, the robot takes the way around or detours in the same direction when it also tries to avoid or escape from the robot, and in such case, they are unable to escape from each other. Further, if they try to change the way around into the reverse direction for the purpose of avoiding, but at the same timing, then they are also unable to avoid the collision, and during this time period, they come close to each other too much, then the moving obstacle and the robot must decelerate or stop for the purpose of avoiding the collision on each other.

For example, in the following Patent Document 1 is disclosed a technology, wherein an infrared sensor, being provided for detecting infrared rays irradiating from an obstacle, determines on whether the obstacle is a person or not, and there is provided a means for bringing the robot into a condition of waiting for a predetermined while stopping if determining that it is a person, waiting for the person to go away from an advancing direction, and if going away, then the robot starts the movement thereof, again.

Also, in the following Patent Document 2 is disclosed a technology, relating to an automobile, but differing from the present invention, wherein collision is estimated with a moving article jumping or rushing out from a dead angle for a driver, and thereby executing a drive assisting control.

[Patent Document 1] Japanese Patent Laying-Open No. Hei 9-185412 (1997); and

[Patent Document 2] Japanese Patent Laying-Open No. 2006-260217 (2006).

BRIEF SUMMARY OF THE INVENTION

However, with the technology described in the Patent Document 1 mentioned above, in case where the robot moves in a place of work or town, the possibility is high that a person is in the moving direction thereof, and it is impossible for the robot to make quick movement if stopping on every such occasion; therefore, there is a problem that an efficiency of work of the robot and usefulness of the robot is lowered down. Further, in the conventional technology mentioned above, no mentioning is made on a countermeasure for the obstacles other than the persons.

Also, with the technology described in the Patent Document 2 mentioned above, however in an office or a workshop, for example, i.e., a human-mixing circumstance, in which the autonomous mobile robot according to the present invention must operate, since width of a path on a crossing, which is necessary for that conventional technology, is unclear, and it is also impossible to specify the moving direction of the obstacle, therefore it cannot be applied into such circumstance as it is.

By taking such the problems mentioned above into the consideration thereof, according to the present invention, an object thereof is to provide an autonomous mobile robot apparatus for enabling quick movement thereof while avoiding collision due to rushing out, without lowering the efficiency of job, and a method for the autonomous mobile robot to avoid rush-out collision thereof.

According to the present invention, for accomplishing the object mentioned above, first of all, there is provided an autonomous mobile robot apparatus, comprising: an obstacle detecting unit, which detects an obstacle; a route producing unit, which determines a route for reaching to a destination while avoiding the obstacle detected by said obstacle detecting unit upon basis of a predetermined avoiding method, as well as, a velocity thereof; and a moving unit, which loads said obstacle detecting unit and said route producing unit thereon and moves, thereby operating under circumstances mixing with a human being(s), wherein said obstacle detecting unit, further, detects a terminal point of an article lying in an advancing direction of said autonomous mobile robot apparatus, and a distance between said terminal point and said autonomous mobile robot apparatus, and said route producing unit, when said obstacle detecting unit detects the terminal end of said article, controls at least either one of the route and the velocity thereof, so as to avoid to collide on the obstacle, which rushes out from said terminal point, in the advancing direction of said autonomous mobile robot apparatus, centering around said terminal point.

Also, according to the present invention, for accomplishing the object mentioned above, too, there is provided a method for avoiding rush-out collision within an autonomous mobile robot apparatus having: an obstacle detecting unit, which detects an obstacle; a route producing unit, which determines a route for reaching to a destination while avoiding the obstacle detected by said obstacle detecting unit upon basis of a predetermined avoiding method, as well as, a velocity thereof; and a moving unit, which loads said obstacle detecting unit and said route producing unit thereon and moves, thereby operating under circumstances mixing with a human being(s), comprising the following steps of: measuring a distance between a terminal point of an article lying in an advancing direction of said autonomous mobile robot apparatus, and a distance between said terminal point and said autonomous mobile robot apparatus, by said obstacle detecting unit, and controlling at least either one of the route and the velocity thereof, so as to avoid to collide on the obstacle, which rushes out from said terminal point, in the advancing direction of said autonomous mobile robot apparatus, centering around said terminal point, when said obstacle detecting unit detects the terminal end of said article.

Further, according to the present invention, within the autonomous mobile robot apparatus or the method for avoiding rush-out, as described in the above, it is preferable that said route producing unit determines a collision avoiding area by taking either one of a stop distance of said robot apparatus and an advancing distance of said obstacle up to stoppage of said robot apparatus when said obstacle rushes out, centering around said terminal point, and further decides a possibility of collision upon the obstacle rushing out from said terminal point, upon said collision avoiding area determined, and further that said route producing unit controls at least either one of the route and the velocity thereof, depending on the possibility of collision upon the obstacle rushing out from said terminal point determined upon basis of said collision avoiding.

In addition thereto, within the autonomous mobile robot apparatus or the method for avoiding rush-out, as described in the above, it is preferable that said route producing unit decelerates said velocity when the velocity of said autonomous mobile robot apparatus can be decelerated, in case where there is the possibility of collision upon the obstacle rushing out from said terminal point, which is determined upon basis of said collision avoiding area, and causes said robot apparatus to take a long way around as the route thereof where it is impossible to decelerate the velocity of said robot apparatus, and that said route producing unit obtains the advancing distance of said obstacle up to stoppage of said robot apparatus when said obstacle rushes out, with multiplying an estimated maximum velocity of said obstacle by stop time of said robot apparatus.

According to the present invention mentioned above, in relation to the autonomous mobile robot apparatus, which can be used under the circumstances where persons and robots come and go each other, there can be provided a superior effect of achieving the autonomous mobile robot apparatus and the method for avoiding rush-out collision of the autonomous mobile robot apparatus, which can move quickly while avoiding the collision due to rush-out, therefore without lowering the work efficiency thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 5 is a view for showing an example of information, in relating to an avoiding method, within the autonomous mobile robot mentioned above;

FIG. 9 is a view for showing an example of selection of an avoidance method within the autonomous mobile robot mentioned above;

FIG. 10 is a view for explaining the principle for protecting from the rush-out collision within the autonomous mobile robot mentioned above;

DETAILED DESCRIPTION OF THE PREFERRED EMBODIMENTS

Figure 1:
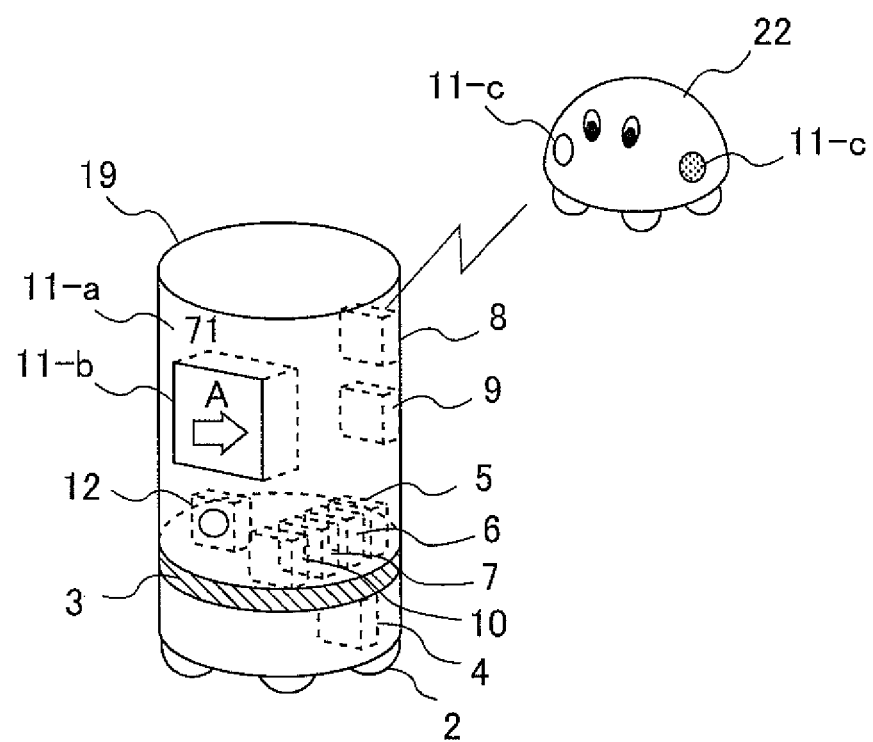
FIG. 1 is a perspective view for showing an example of the entire outlook structure of an autonomous mobile robot, according to an embodiment of the present invention.
Figure 2:
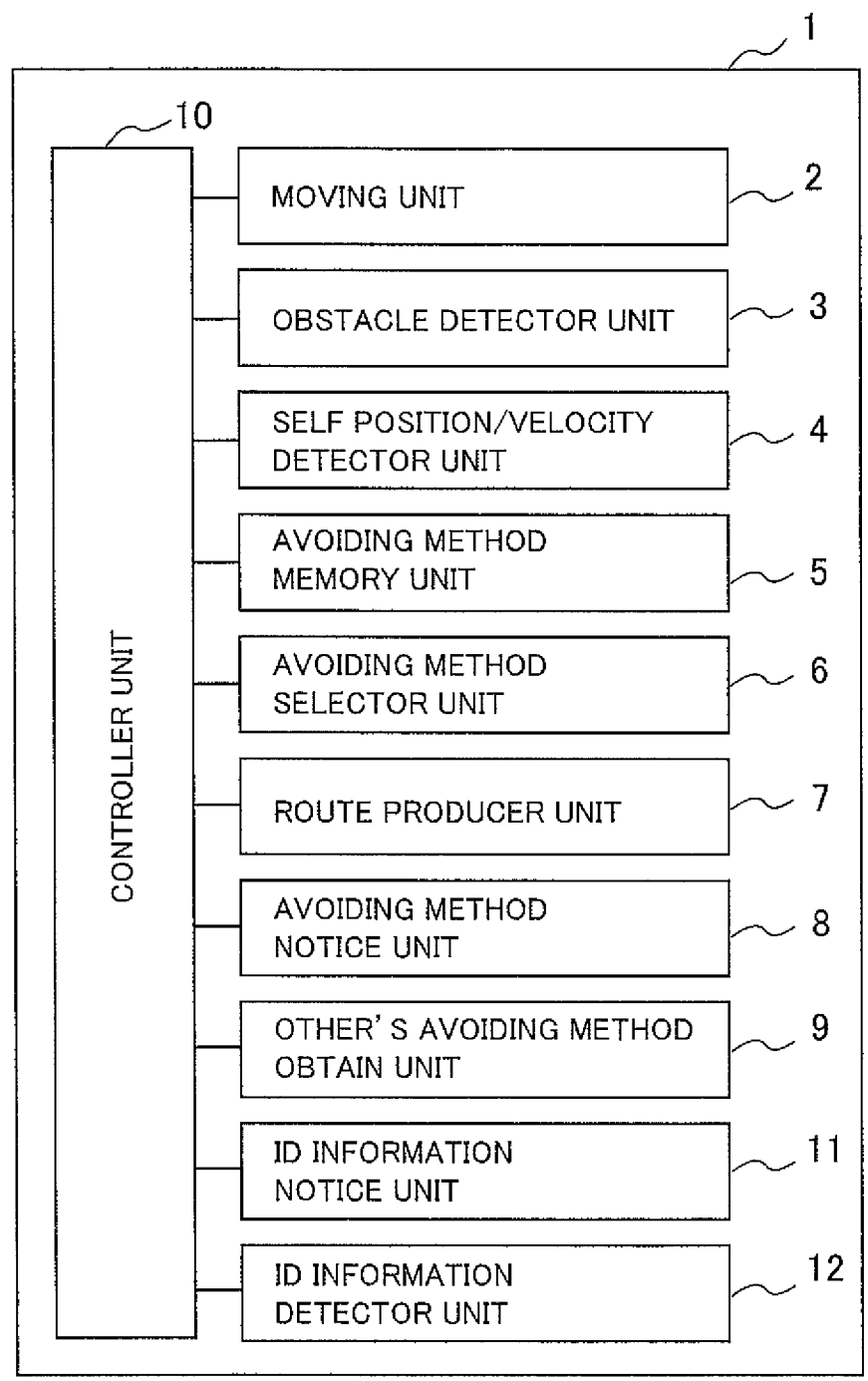
FIG. 2 is a block diagram for showing an example of the inner structures of the autonomous mobile robot mentioned above.

Hereinafter, an embodiment according to the present invention will be fully explained, by referring to the drawings attached herewith. First of all, FIGS. 1 and 2 are views for showing an outlook configuration of an autonomous mobile robot apparatus, according to the present invention, and an example of the inner structures thereof, respectively.

In those figures, a reference numeral 1 depicts an entire of the autonomous mobile robot apparatus, and a reference numeral 2 depicts a moving means of the apparatus, being constructed with plural numbers of wheels, a motor and a motor driver, etc., for example, thereby allowing the autonomous mobile robot apparatus 1 to move, freely, on a floor surface.

A reference numeral 3 in the figure depicts so-called, an obstacle detector portion or unit, being constructed with a laser radar and an arithmetical or computing unit, etc., for example, and it measures distances up to articles surrounding, thereby obtaining a relative position to the autonomous mobile robot apparatus 1 from an averaged distance, with assuming that an area or region continuing a similar extent of distance is one (1) piece of obstacle, as well as, in particular, regarding an obstacle building up the dead angle, such as, a continuing wall or the like, for example, it obtains an terminal point thereof. Further, it includes a detector means therein, which is constructed with a camera and a video processing apparatus, etc., wherein the obstacle is divided from a background picture thereof, through processing the video pictured by that camera within the video processing apparatus, to measure a position of the obstacle to the background, and thereby obtaining the relative positions of the background and the obstacles to the autonomous mobile robot apparatus 1. However, such measurement is conducted, periodically; a velocity of each of the obstacles is obtained from changes of the relative position thereof, with assuming that the obstacle having a large similarity to data previously measured is the same obstacle. In determination of this similarity, a position, a configuration or a color, etc., can be utilized. However, in case where the processing capacity of that obstacle detector unit 3 is low, it is also possible to omit the calculation of velocities of the obstacles.

A reference numeral 4 in the figure depicts a self-position/velocity detector portion or unit, and this self-position/velocity detect unit 4 obtains the traveling distance (i.e., a mileage) from a staring position within a space (i.e., a plane) where the autonomous mobile robot apparatus lies, by obtaining an accumulated number of rotation of a wheel, for example, and thereby calculating out a self-position and a velocity of that autonomous mobile robot apparatus.

A reference numeral 5 in the figure depicts an avoiding method memory portion or unit, in more details thereof, for memorizing an algorithm for producing a route for avoiding the obstacle, and it can be achieved by writing the algorithm within a hard disc drive (HDD) built therein, for example. Also, a reference numeral 6 depicts an avoiding method selector unit, and it is a computing unit for selecting an appropriate avoiding method among avoiding methods, which are memorized in the avoiding method memory unit 5 mentioned above in the form of avoiding information. However, the selecting method will be mentioned, later, in more details thereof.

Also, a reference numeral 7 in the figure depicts a route producer portion or unit, and in more details thereof, it is a computing unit for producing a moving route of the autonomous mobile robot apparatus 1, upon basis of the information of obstacles, which is detected by the obstacle detector unit 3, in accordance with the algorithm selected by the avoiding method selector unit 6.

Further, a reference numeral 8 in the figure depicts an avoiding method notice portion or unit, which notices the information in relation to the avoiding method mentioned above, to other robot(s) (hereinafter, it may be called "other (s)"), through communication, such as, wireless LAN or a short range communication, for example. Also, a reference numeral 9 depicts an other's avoiding method obtain portion or unit, which obtains the information relating to the avoiding method, which the other informs, through communication. Also, a reference numeral 10 depicts a control means, and is a controller portion or unit, being constructed with a computing unit for controlling each of those means, which are mentioned above or will be mentioned below, building up the autonomous mobile robot apparatus.

Namely, a reference numeral 11 in the figure depicts an individual identity information notice means, which notices the information, being noticeable by a means other than the communication, for example, the individual identity information among those information relating to the avoiding methods, to the other robot(s) or a person(s) through a visible display, such as, a painting, a liquid crystal display, etc., for example. And, a reference numeral 12 depicts an individual identity information detect means, and it obtains the information, which the other(s) notices through the individual identity information notice means 11, by means of a camera and a video processing apparatus. The video obtained by the camera is processed, so as to detect the individual identity information, and further there is obtained a space position, in which the individual identity information is detected.

However, the autonomous mobile robot apparatus mentioned above is so-called a high-performance robot, and each individual of those will be called, a "robot". Also, in FIG. 1 mentioned above is also shown an outlook configuration of a low-performance robot 22, for the purpose of consideration. Further, a reference numeral 11-*c* in the figure depicts avoiding direction information by means of a lamp, and in more details thereof, lighting of either one of the lamps, which are disposed on the left-hand and the right-hand sides of the robot, indicates that the robot is in an operation of changing the moving direction thereof to the left or right. Further, other than the structures mentioned above, the autonomous mobile robot apparatus comprises the following constituent elements, which will be mentioned by referring to also FIG. 2.

Thus, in FIG. 1 mentioned above, a reference numeral 11-*a* is the individual identity information, which is painted on the surface of a housing of the robot. For example, on the robot 19 is painted a number "71". This is the number differing for each of the robots. Also, a reference numeral 11-*b* depicts avoiding capacity information and the avoiding direction information, which are displayed on a liquid crystal display of the robot 19. For example, on the robot 19 is displayed "A" and "=>", at present, wherein "A" indicates that the avoiding capacity is high one, and "=>" indicates that the robot is now in the condition of changing the moving direction to the left seeing from the robot.

Figure 3:
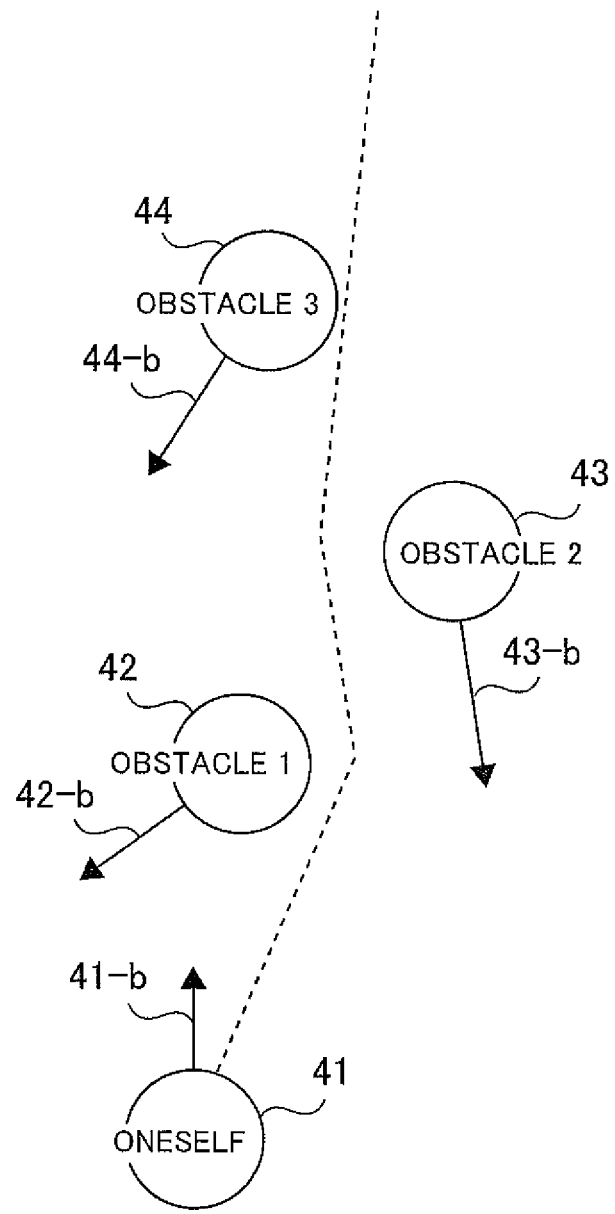
FIG. 3 is a view for showing an example of a moving route, which is produced by the autonomous mobile robot mentioned above.

Next, FIG. 3 attached herewith is a view for showing an example of a moving route, which is produced within the route producer unit 7, in particular, in the autonomous mobile robot apparatus mentioned above. Herein, a reference numeral 41 depicts a self-robot (hereinafter, it may be also called "oneself"), and reference numerals 42, 43 and 44 depict the obstacles, respectively. Also, a reference numeral 41-*b* is a vector for showing the present velocity of the self-robot 41. Also, other vectors 42-*b*, 43-*b* and 44-*b* in the figure indicate the present velocity of the obstacles, respectively. In this manner, the route producer unit 7 calculates out the route thereof so that the self-robot 41 will not collide on each of the obstacles, mutually. Hereinafter, this route producing method is called a "route producing method a".

Figure 4:
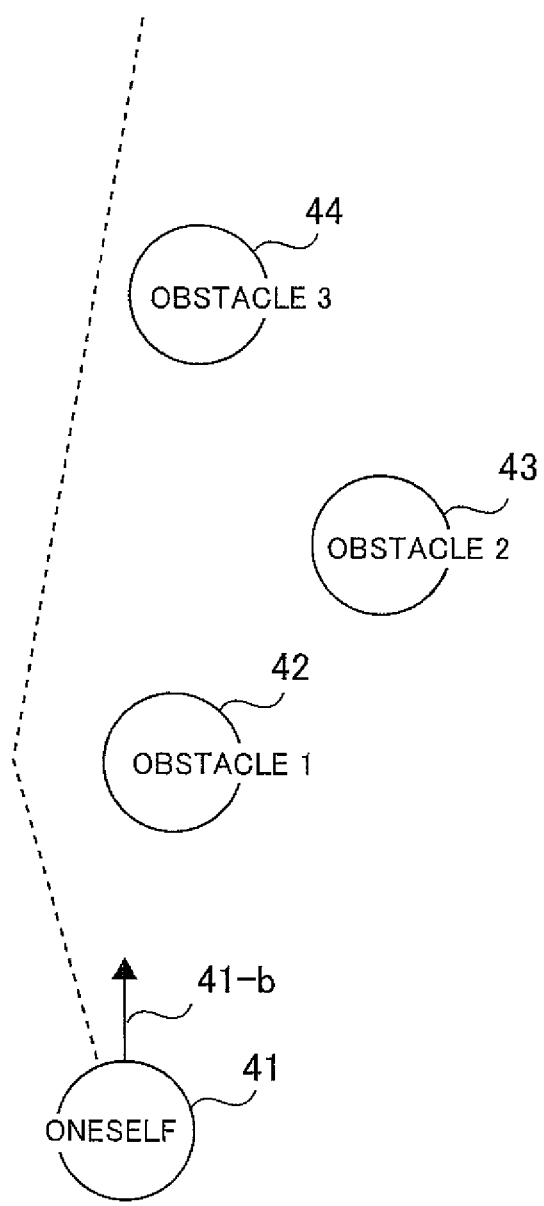
FIG. 4 is a view for showing an example of other moving route, which is produced by the autonomous mobile robot mentioned above.

FIG. 4 shows an example of other produced moving route, which is produced by the autonomous mobile robot apparatus mentioned above. This example is the moving route, which the route producing unit 7 produces in case where the velocity of the obstacle cannot be calculated because of low processing capacity of the obstacle detector unit 3. In this case, the self-robot 41 calculates out such the route that it will not collide on each other, responding to the present positions of the obstacles 42, 43 and 44. Hereinafter, this route producing method is called a "route producing method b".

Following to the above, FIG. 5 attached herewith shows an example of the information relating to the avoiding methods. This information relating to the avoiding methods is noticed to the other robots (hereinafter, it may be called "others"), by the avoiding method notice unit mentioned above, through the communication means, such as, the wireless LAN or the short range communication, for example.

Information included in the information relating to this avoiding method differs from, depending upon the capacity or performance of the robot. However, this information relating to the avoiding methods will be explained in the followings, in more details thereof.

(1) The "avoiding capacity" is the information indicative of capacities of the robot, of detecting the obstacle and of producing the route of the robot, and it differs from depending upon the configuration of the robot. For example, the high-performance robot is able to detect the position and the velocity of the obstacle with high accuracy, and for this reason, is able to produce the route with the route producing method a. On the other hand, the low-performance robot is cannot detect the velocity of the robot, but only able to detect the position with low accuracy, therefore it conducts the route production with the route producing method b.

(2) The "avoiding direction" is the information of indicating the avoiding is made to the left-hand side or to the right-hand side when conducing the avoiding. There are two (2) ways of the expression method of the left-hand side or to the right-hand side. A first expression method is in that the moving direction of oneself is changed into the left-hand side or into the right-hand side, with respect to the present moving direction of oneself. A second expression method is in that, when passing by the obstacle, it passes through the left-hand side or the right-hand side of that obstacle, seeing that from self-robot. The avoiding direction information includes therein the information, indicating that the expression should be made by either one of the expressing methods. Rather than the first one, but the second expression method is suitable for the robots themselves to understand or recognize the avoiding methods thereof with each other, and thereby enables to produce a smooth avoiding route. However, since the second expression method needs detection of the velocity of the obstacle so as to estimate the positional relationship when passing by, for the low-performance robot, it is impossible to express with the second expression method.

(3) The "position information" is present position information of the robot at noticing origin. The robot obtaining the information relating to the avoiding methods utilizes it for checking or comparing the avoiding method obtained and the obstacle, which is detected by the obstacle detector unit 3, etc.

(4) The "individual identity information" is the information indicative of a unique number of each robot for identifying the robots one by one. The robot obtaining the information relating to the avoiding method compares the information obtained, the individual identify information obtained by the individual identity information detect means 12, which will be mentioned later, and the position where the individual identity information lies, and also the position detected by the obstacle detector unit 3, so as to check the avoiding method obtained ant the obstacle, which the obstacle detector unit 3 detects.

However, with the configuration of the robot, since it is possible to check the avoiding method obtained and the obstacle, which the obstacle detector unit 3 detects, if it is either one, (3) or (4) mentioned above, therefore, it is enough that there is either one, the (3) or the (4) mentioned above. Also, in the comparison between the avoiding directions of oneself and the other, which will be mentioned later, it can be used for determining which one of the avoiding methods should be taken with priority. For example, the individual identity information is expressed by a numerical value, and the direction is determined to be taken with the priority depending upon the value thereof.

(5) A "notice time" is a time when the information relating to the avoiding method is noticed, and it will be used when determining which one of the avoiding methods should be taken with priority, etc., in comparison between the avoiding directions of oneself and the other, which will be mentioned later. For example, the priority should be taken for the earlier one of the notice time. The method of determining the priority of the avoiding direction may be either the above (4) or the above (5), and the unnecessary one may not be included in the notice information mentioned above.

(6) "Presence/position of companion(s)" includes a flag, indicating presence of a companion(s) with oneself, and information for indicating the present position of that companion(s). This is provided for the purpose that the self-robot will not pass through between the other and the companion.

Figure 6:
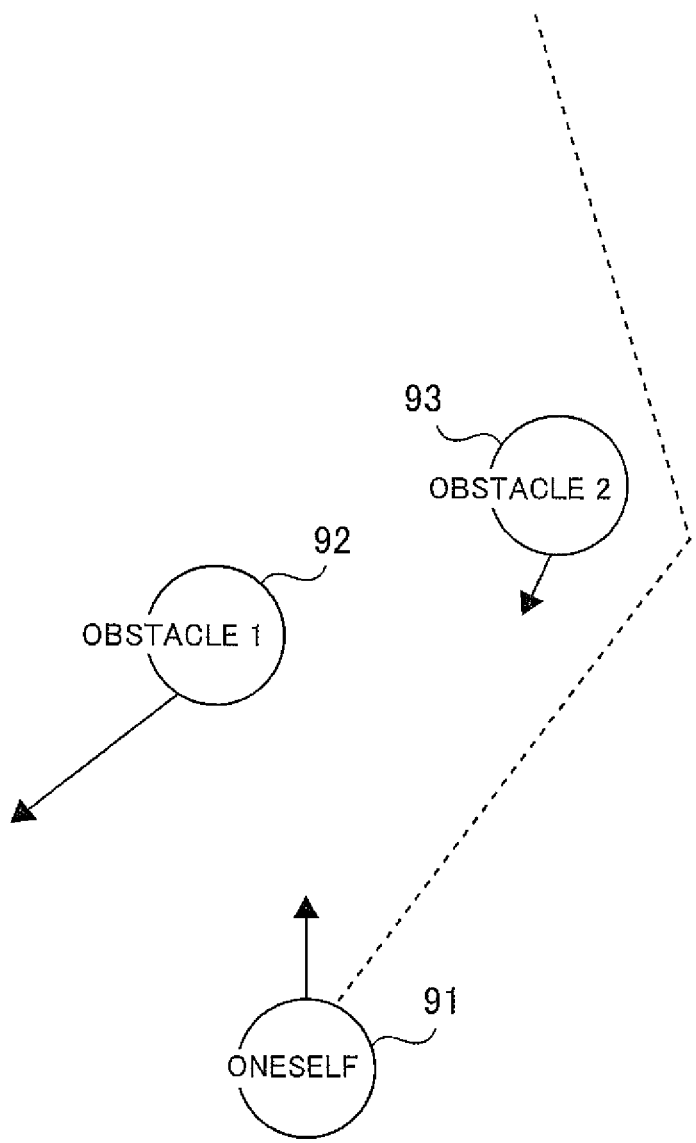
FIG. 6 is a view for showing an example of other moving route, which is produced by the autonomous mobile robot mentioned above.

However, FIG. 6 attached shows an example of the other produced moving route, which is produced by the autonomous mobile robot apparatus mentioned above. A reference numeral 91 depicts the self-robot, reference numerals 92 and 93 the others, which are obstacles for the self-robot 91. If the presence of companion and the position information of the companion are included in the information relating to the other's avoiding method from the other 92, which the self-robot receives, then self position information within the information relating to the avoiding method of the other and the position of the obstacle and the position of companion are compared with the position of the obstacle detected, and thereby specifying the robot accompanying the companion themselves as the obstacle. And, the route producer unit 7 produces a route other than the route passing through between the companions themselves.

(7) "Passing inhibited direction" is information for indicating a direction, into which the other should not pass through when it tires to passes through in the vicinity thereof.

Figure 7:
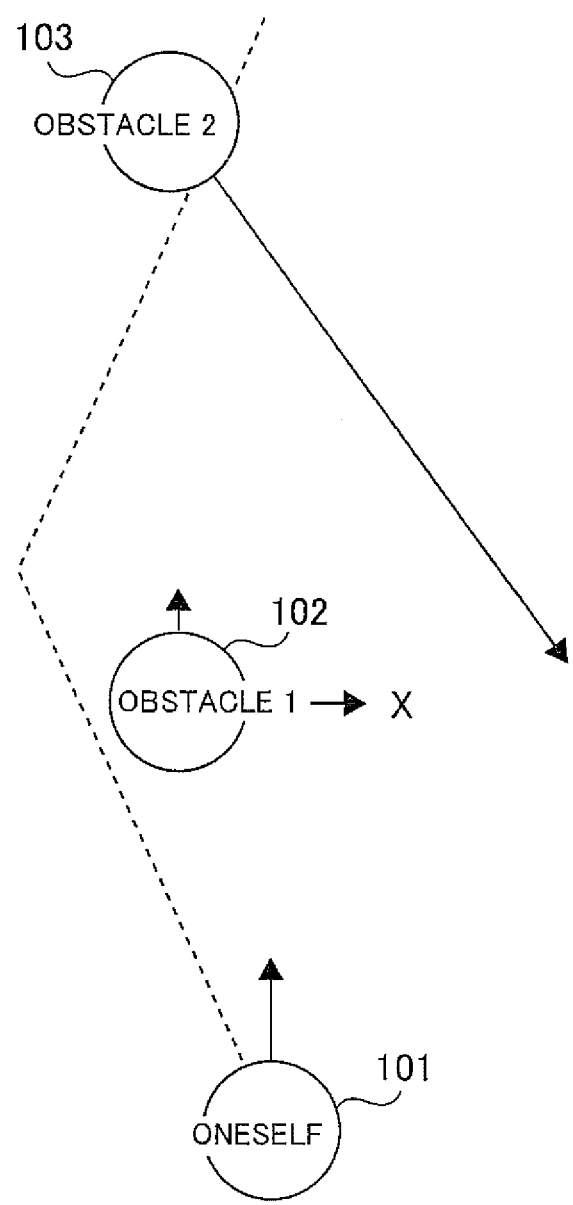
FIG. 7 is a view for showing an example of further other moving route, which is produced by the autonomous mobile robot mentioned above.

FIG. 7 attached shows an example of other produced moving route, which is produced by the autonomous mobile robot apparatus mentioned above. A reference numeral 101 depicts the self-robot, a reference numeral 102 depicts the other, which is the obstacle for the self-robot 101, and a reference numeral 103 depicts the obstacle other than that, respectively. For example, information "north" is entered into the passing inhibited direction, when the other 102 detects the obstacle 103, and when it determines dangerous if the other 102 passes through into the "north" direction of the self-robot 101. In case where there is included the information relating to the passing inhibited direction, among the other's avoiding method information from the other 103, which the self-robot 101 receives, then the route producer unit 7 produces a route other than the route passing into the direction designated.

(8) "Obstacle detection information" is the obstacle position/speed information of the obstacle, which the self-robot detects. This is to be used when the other produces the route.

Figure 8:
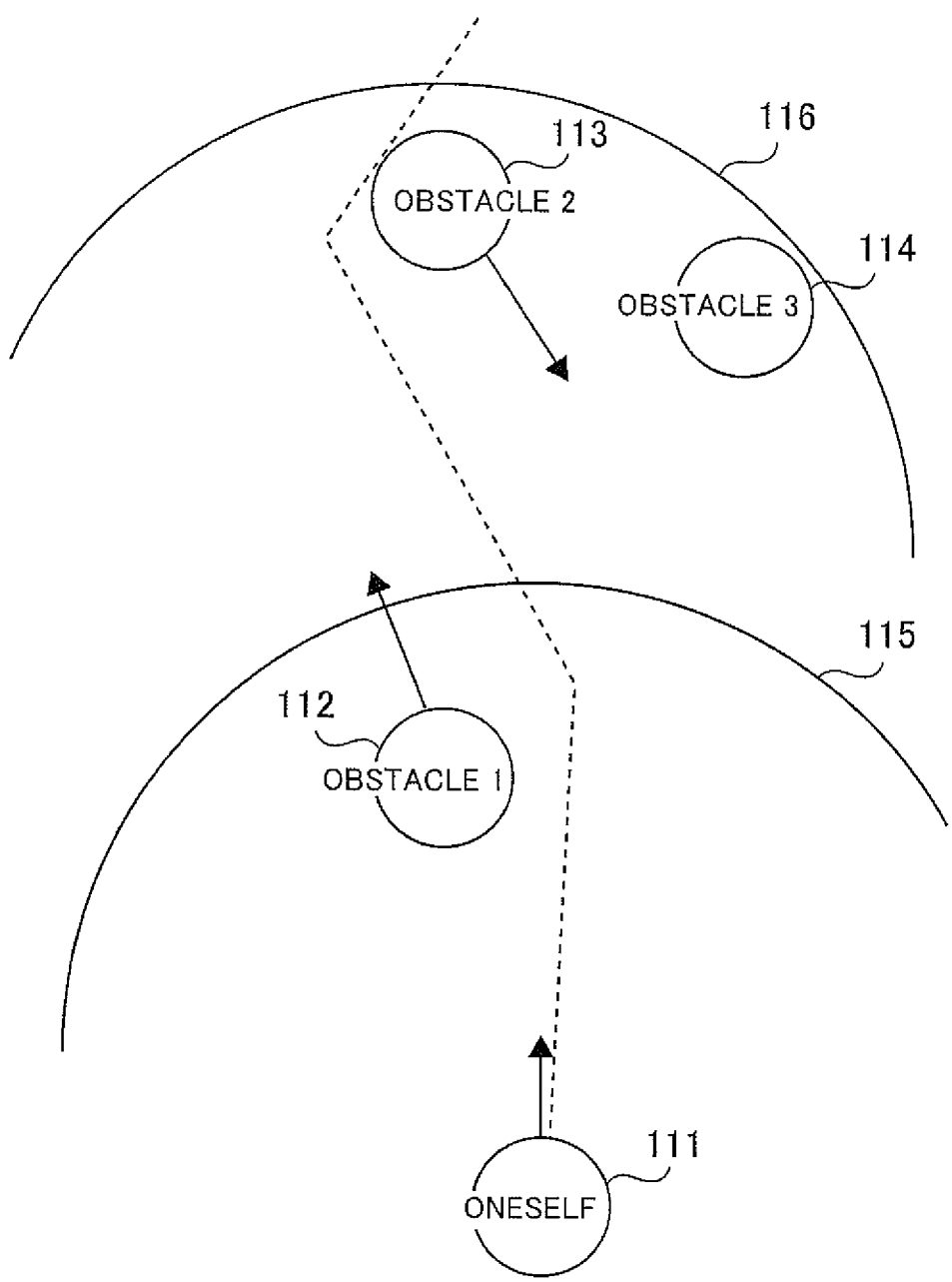
FIG. 8 is a view for showing an example of further other moving route, which is produced by the autonomous mobile robot mentioned above.

FIG. 8 attached is a view for showing an example of other produced moving route, which is produced by the autonomous mobile robot mentioned above. A reference numeral 111 depicts the self-robot, a reference 112 depicts the other, which is the obstacle for the self-robot 111, and reference numerals 113 and 114 depict the obstacles other than that, respectively. For example, when the robot 112 detects the obstacles 113 and 114, the robot 112 enters the position/velocity information of the obstacles 113 and 114 into the obstacle detection information. In case where there is included the obstacle detection information mentioned above, among the other's avoiding method information from the robot 112, which the self-robot 111 receives, then the route producer unit 7 produces a route for avoiding all of the obstacles, including the obstacles, which the self-robot 111 detects, and also the obstacle detection information within the other's avoiding method information from the robot 112 therein.

FIG. 9 is a view for showing an example when the autonomous mobile robot apparatus mentioned above selects the avoiding method. The avoiding method selector unit 6 of the autonomous mobile robot apparatus 1 determines on whether the other's avoiding method obtain unit 9 obtains or not, the information relating to the avoiding method of the other(s), and in case when obtaining, it changes the avoiding method to be selected depending upon the information relating to the avoiding method of the other robot(s).

On the other hand, when no information cannot be obtained relating to the avoiding method, which the other robot notices, selection is made on the avoiding method of the case where no information is obtained relating to the avoiding method, while when the information can be obtained, selection is made on the case where the information is obtained. Hereinafter, the former is called, an "avoiding method A", and the later, an "avoiding method B", respectively.

In case of the avoiding method A, a route is produce for reaching a destination without collision on the obstacle. If there can be considered a plural number of routes, one (1) of those is selected. As a criterion of selection may be used the followings: such as, a rote having the shortest distance or a route passing through a side opposite to the moving direction of the obstacle with respect to that obstacle, etc.

In case of the avoiding method B, upon basis of the information relating to the avoiding method, which the other robot notices, comparison is made between the avoiding directions of oneself and the other. If there is a possibility that the both collide on each other, either one (1) of them changes the avoiding direction. As an example of determining which one should change the direction, for example, comparison is made between the avoiding performances or capacities of oneself and the other robot, so that one having higher avoiding performance changes the direction. If the performances are same to each other, for example, comparison is made on the unique numbers thereof, i.e., the individual identity information, and then the younger one has priority. Also, in other cases, comparison is made on the notice times, and the earlier one has priority. Then, such a route up to the destination is produced that satisfies the avoiding method according to that.

Further, explanation will be made on "rush-out collision avoiding". However, this "rush-out collision avoiding" is a function for avoiding the collision upon the obstacle (i.e., a person or other robot, etc.) having a possibility of rushing out from the dead angle of the autonomous mobile robot apparatus, which is defined by a wall, etc., for example.

Explanation will be made on the principle of the "rush-out collision avoiding", according to the present invention. Thus, this figure shows a case wherein the autonomous mobile robot apparatus mentioned above is moving with velocity "V" and there is an article defining the deal angle in the moving direction. In this case, as is shown by a round of a broken line, on the reverse side of the article defining the dead angle, it can be imaged or supposed that an obstacle (i.e., the person or other robot, etc.) would be there and rushes out from the dead angle. However, herein "L" in the figure indicates the distance of the article defining the dead angle, in particular, from an end thereof up to the robot, and "a" a stop distance (i.e., a moving distance from the position where the robot starts stopping operation up to the position where it actually stops), and it depends on the velocity of the robot. And, with "b" indicating an estimated moving distance of the obstacle, it can be expressed as follows:

velocity of obstacle(for example, an estimated maximum velocity))×stop time of the robot(i.e., time period from the time when the robot stats stopping operation up to the time when it actually stops)

and, in more details thereof, it indicates the distance that the obstacle moves or advances, up to when the robot stops urgently, when the obstacle rushes out.

However, according to the present invention, fundamentally, the "rush-out collision avoiding" is achieved within the office or the workshop where peoples are mixed, through controlling the velocity and the route of the autonomous mobile robot apparatus so as to satisfy the following condition, for example, by taking the relationship between each of the distances "a" and "b" mentioned above into the consideration thereof.

$$L > a + b$$

Figure 11A:
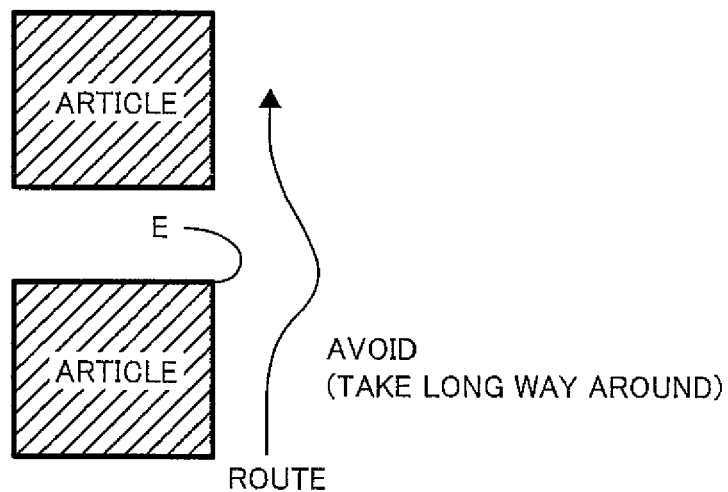
FIGS. 11A and 11B are views for explaining a method for avoiding an obstacle within the autonomous mobile robot mentioned above.
Figure 11B:
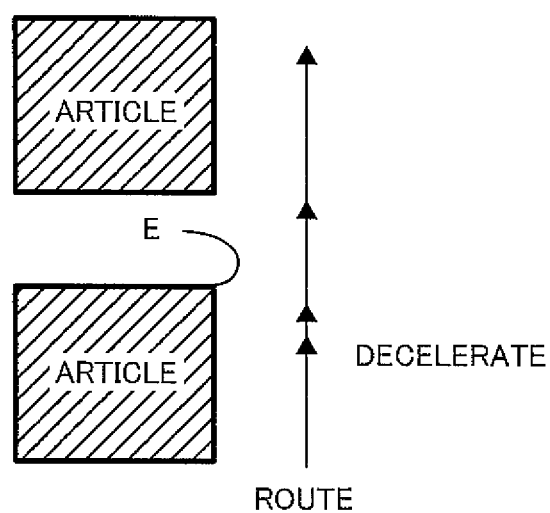

Following to the above, explanation will be made on the method for avoiding obstacle of the autonomous mobile robot apparatus, upon the "rush-out collision avoiding" according to the present invention, by referring to FIGS. 11A and 11B attached herewith. Thus, FIG. 11A shows the movement of the robot making a detour by changing the route into an outside thereof, in the vicinity of an terminal point of the article defining the dead angle, thereby to avoid the collision thereupon due to rush-out of the obstacle, while FIG. 11B the movement of the robot making a detour by lowering the velocity thereof (i.e., decelerating), in the vicinity of the terminal point of the article defining the dead angle, thereby to avoid the collision thereupon due to rush-out of the obstacle, respectively. Further, "E" in the figure shows the terminal point of the article. And, according to the present invention, applying those avoiding methods appropriately depending upon the circumstances or state, it is possible to provide the autonomous mobile robot apparatus for avoiding the obstacle, with certainty, as well as, there is achieved the autonomous mobile robot apparatus for enabling quick movement thereof while avoiding the collision due to rush-out of the obstacle, i.e., without lowering an efficiency of work.

Figure 12:
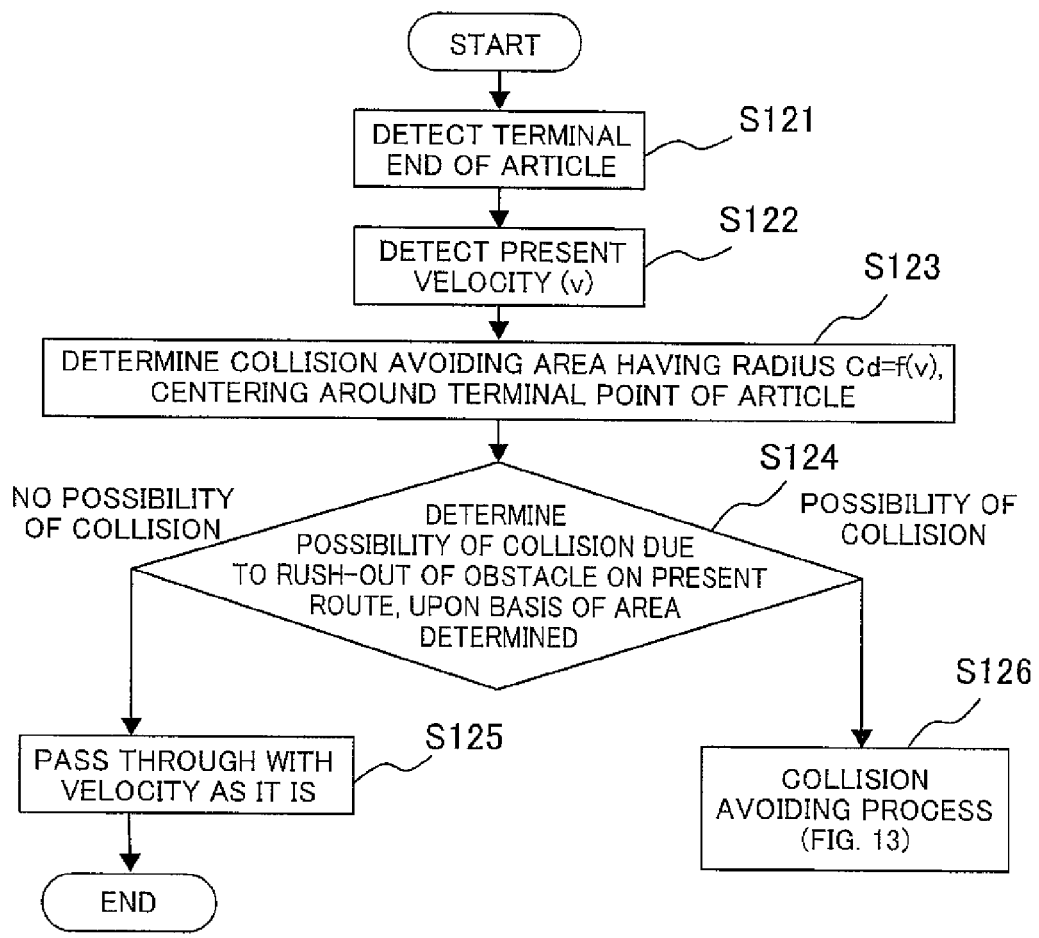
FIG. 12 is a flowchart for showing an example of the method for avoiding an obstacle, in more details thereof, within the autonomous mobile robot mentioned above.
Figure 13:
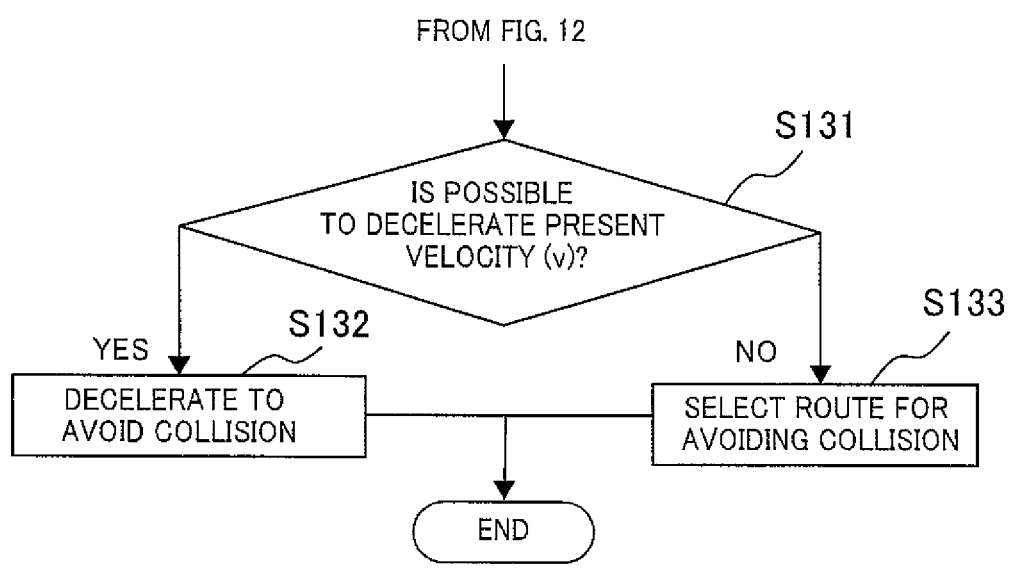
FIG. 13 is also a flowchart for showing an example of the method for avoiding an obstacle, in more details thereof, within the autonomous mobile robot mentioned above.

Further, FIGS. 12 and 13 show flowcharts, each for achieving the "rush-out collision avoiding" operation, according to the present invention mentioned above. However, those flowcharts are memorized in a memory device of the computing unit, building up the controller unit 10 mentioned above (see FIG. 2), as software, and are executed by that computing unit.

First of all, in FIG. 12, when starting the process, firstly detection is made on the terminal point (see "E" in FIGS. 11A and 11b) of the article (i.e., the wall, etc.) (step S121), further detection is made on the preset velocity "v" of the autonomous mobile robot apparatus (step S122). Following thereto, upon basis of the result of detections mentioned above, a collision avoiding area or region of a radius (distance) "Cd" is determined around the terminal point of the article mentioned above (step S123). However, the radius (distance) "Cd" depends upon the distance "b", i.e., the moving distance of the obstacle up to where the robot urgently stops when the obstacle rushes out, and also the detected present velocity "v" mentioned above, and it can be expressed by an equation; $Cd = f(v)$ or $Cd = f(b, v)$.

Thereafter, upon basis of the determined collision avoiding area mentioned above, a possibility is determined that the autonomous mobile robot apparatus collides on that obstacle, when the autonomous mobile robot apparatus advances on the present route and with the present velocity and when the obstacle (i.e., the person or the other robot) jumps or rushes out from the dead angle (i.e., the terminal point of the article) (step S124). As a result, if determining that there is no possibility of collision between the autonomous mobile robot apparatus and the obstacle (i.e., "no possibility of collision"), then the autonomous mobile robot apparatus advances on the present route with the velocity, as it is (step 125). On the other hand, there is a possibility that the autonomous mobile robot apparatus and the obstacle collide on each other (i.e., "probability of collision"), as a result of the determination, then the following process for avoiding collision will be executed.

FIG. 13 shows the process for avoiding collision, which should be executed when determining is made "probability of collision" in the determination mentioned above. Thus, when determining is made "probability of collision" in the above, firstly it is determined on whether the autonomous mobile robot apparatus can further decelerate (lower) the present velocity "v" thereof, or not (step S131). As a result, if determining that it is possible to decelerate (lower) the present velocity "v" ("Yes" in the figure), the autonomous mobile robot apparatus lowers the present velocity "v" (i.e., slow down), and thereby avoiding the collision with the obstacle, which can rush out from the dead angle) (step S132). On the other hand, in case where it is impossible to decelerate (lower) the present velocity ("No" in the figure), selection/setup is made on a collision avoid route for avoiding collision with the obstacle, and thereby avoiding the collision with the obstacle, which can jump or rush out from the dead angle (step S133). Thus, with executing the processes mentioned above, repeatedly, the autonomous mobile robot apparatus is able to avoid the collisions on the obstacle, with certainty, and also enables quick movement thereof while avoiding the collision due to the rush-out of the obstacle, i.e., being applicable under the circumstances where parsons and robots go and back, but without lowering the work efficiency of the robot.

Further, explanation will be made on an example of the method for avoiding the rush-out collision of the autonomous mobile robot apparatus mentioned above, in more details thereof, by referring to FIGS. 14A and 14B attached herewith. However, in those figures show the movement thereof, in particular, when the autonomous mobile robot according to the present invention passes through so-called a "T"-shaped road or path. Further, in those figures, a reference numeral 200 depicts wall surfaces defining a space, in which the robot lies, and in particular, outlines of the wall surfaces 200 are indicated by thick lines. Also, a slanted portion 201 in the figures indicate areas where the robot can pass through, and further, "E" indicates the terminal point of the wall surface. And, the autonomous mobile robot apparatus 1, according to the present invention, determines the route (indicated by two (2) pieces of lines attached with a reference numeral 202) and/or the velocity thereof, by taking the stop distance "a" into the consideration thereof, together with the moving distance "b" of the obstacle up to where the robot urgently stops when the obstacle rushes out, around the terminal point "E" of the wall surface mentioned above, defining the dead angle during when it moves.

Figure 14A:
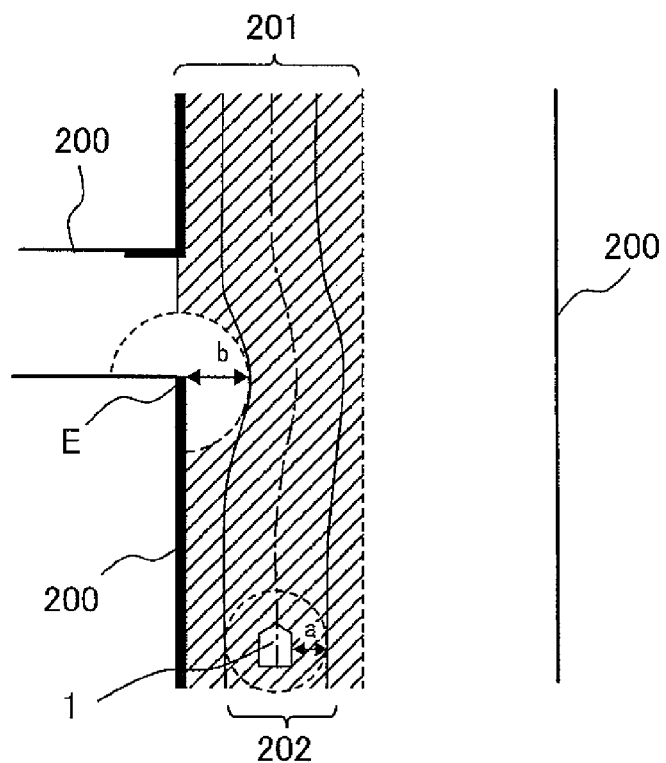
FIGS. 14A and 14B are views for explaining an example of an operation when the autonomous mobile robot mentioned above passes through a "T"-shaped path.

FIG. 14A shows an example, in particular, when the robot passes through a wide "T"-shaped road or path having wide width, and as is clear from the figure, because the width of the path is wide, it takes a long way around in the vicinity of the terminal point "E", and thereby avoiding the possible collision due to the jump or rush-out of the obstacle. On the other hand, FIG. 14B shows, in particular, an example when the robot passes through a narrow "T"-shaped path, and in this case, as is clear from the figure, since it is impossible to take a long way around in the vicinity of the terminal point "E", the robot lowers down the velocity thereof (i.e., slow down), and thereby avoiding the possible collision due to the jump or rush-out of the obstacle.

Further, FIGS. 15A to 15E show the manner or movement when the autonomous mobile robot apparatus 1, according to the present invention, avoids the collision with a person 300, who jumps out from an article (in this example, a partition 203) defining the deal angle. Thus, in FIG. 15A, though the autonomous mobile robot apparatus 1 is advancing along the route determined with a predetermined velocity; but in FIG. 15B, it detects the terminal point "E" of the partition 203, i.e., the article, and then lowers the velocity (decelerate). As a result thereof, in FIG. 15C, it stops or slows down with the minimum velocity, for avoiding the collision on the person 203 who rushes out from the partition 203, and thereafter, in FIG. 15D, the person rushing out has passed therethrough, and in FIG. 15E, again, the robot advances along the route determined with the predetermined velocity.

Figure 16A:
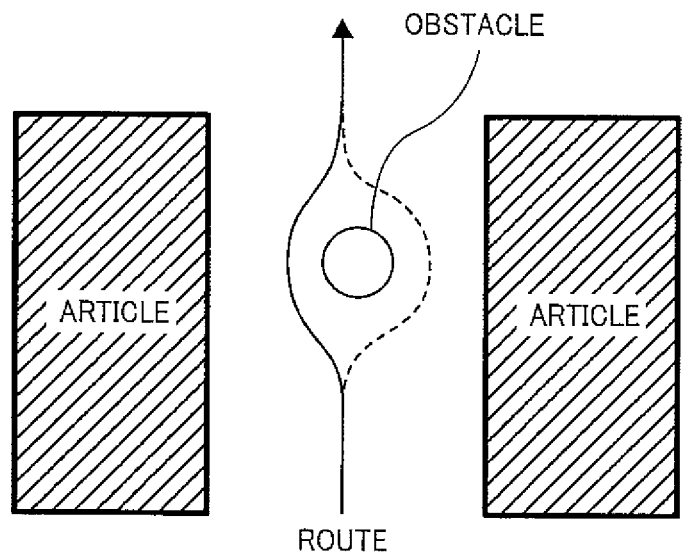
FIGS. 16A and 16B are views for explaining the obstacle avoiding method, when the autonomous mobile robot mentioned above detects terminal points of the obstacle and the article.
Figure 16B:
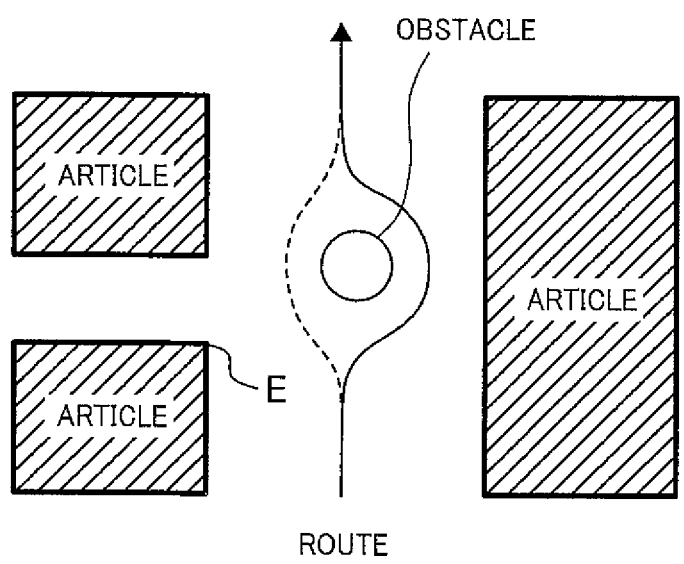

Explanation will be made on the detailed example of the method for avoiding obstacle when detecting the terminal point of the obstacle and the article, within the autonomous mobile robot apparatus mentioned above, by referring to FIGS. 16A and 16B. Those FIGS. 16A and 16B show the avoiding routes, which may be taken when detecting the obstacle. Thus, FIG. 16A shows a case when the robot does not detect the terminal point of the article, and FIG. 16B a case when it detects the terminal point "E" of the article. When detecting the obstacle, there can be considered two avoiding routes; one is to pass through the right-hand side of the article, the other to pass through the left-hand side thereof. In FIG. 16A, since no terminal point of the article is detected, and there is no possibility that the obstacle will rush out from the dead angle, then the avoiding route is selected under the criterion, the route having short distance. In the example shown in the figure, since the distance of the avoiding route on the left-hand side shown by a solid line is shorter than that of the avoiding route on the right-hand side shown by a broken line, then the route on the left-hand side is selected. In FIG. 16B, since the terminal point of the article is detected, and there is a possibility that the article may rush out from the dead angle, it is necessary to decelerate for the purpose of avoiding the collision due to the rush-out. In the example shown inn the figure, since an amount of deceleration along the avoiding route on the left-hand side shown by the solid line is less than that along the avoiding route on the right-hand side shown by the broken line, then the route on the right-hand side is selected. This enables the robot to move as quickly as possible, while avoiding the obstacle and protecting from the rush-out collision. If the avoiding route is sufficiently far from the terminal point of the article, with selection of that avoiding route, there is no need of an urgent stop if the obstacle rushes out from the dead angle, and therefore it is possible to achieve the running being smooth much more.

Figure 14B:
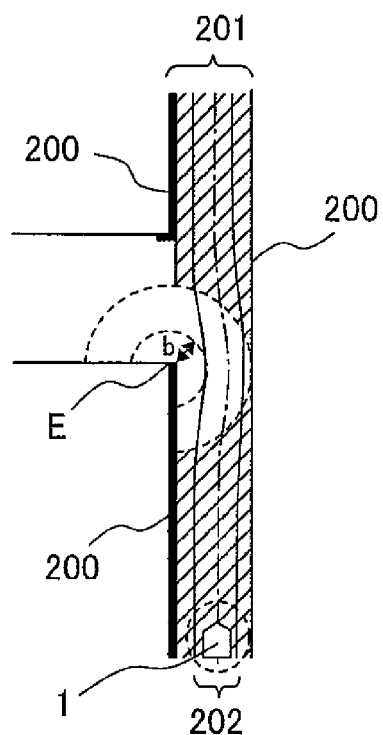
Figure 15A:
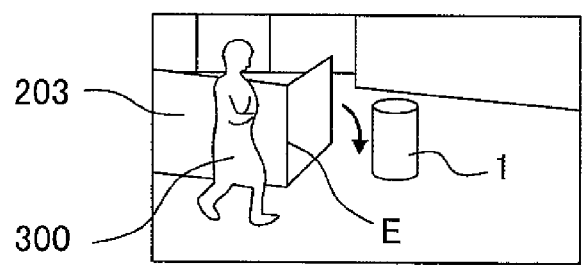
FIGS. 15A to 15E are views for showing a manner of avoiding the collision on a person who rushes out from an article building up a dead angle.
Figure 15B:
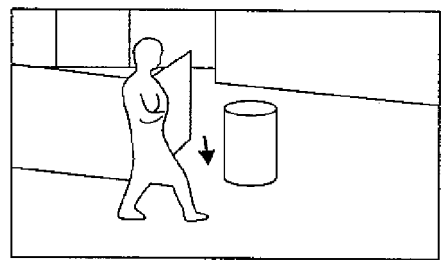
Figure 15C:
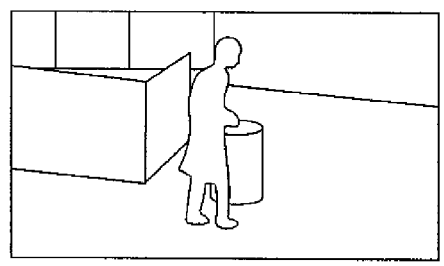
Figure 15D:
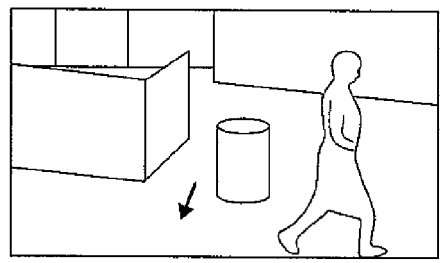
Figure 15E:
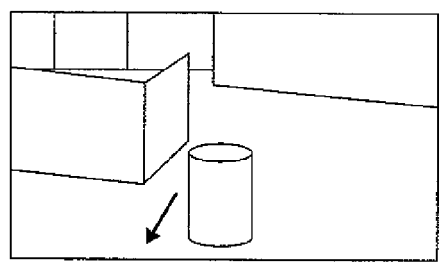

In the detailed explanation of the embodiment given in the above, the explanation was made with assumption that the route and/or the velocity thereof are determined, by taking the stop distance "a" into the consideration thereof, together with the moving distance "b" of the obstacle up to where the robot urgently stops when the obstacle rushes out, around the terminal point "E" of the wall surface mentioned above, defining the dead angle during when it moves; however, the present invention should not be limited only to this, and it is also possible to determine the route and/or the velocity, without taking "a" mentioned above into the consideration thereof, in particular, on the narrow "T"-shaped path, such as, shown in FIG. 14B. Also, in the explanation mentioned above, although it is explained that the distance "b" is determined by taking the estimated maximum velocity of the obstacle, for example; however, in order to avoid useless deceleration and/or slow-down, and thereby to prevent the work efficiency of the robot, it may be preferable to be determined, appropriately, upon basis of experiences under the circumstances of using the robots therein. Namely, it is enough for the robot to escape from or avoid the collision, when the obstacle rushes out. Also, in the explanation given in the above, only the example was explained, in particular, when the obstacle rushes out from the terminal point "E" defining the dead angle; however, it should not be restricted to this, but for the person skilled in the art, it would be apparent the present invention is also applicable to a large article lying on the way of the route of the robot, in the similar manner.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An autonomous mobile robot apparatus, comprising;

an obstacle detecting unit, which detects an obstacle;

a route producing unit, which determines a route for reaching to a destination while avoiding the obstacle detected by said obstacle detecting unit upon basics of a predetermined avoiding method, as well as, a velocity thereof; and a moving unit, which loads said obstacle detecting unit and said route producing unit thereon and moves, thereby operating under circumstances mixing with a human being(s), wherein said obstacle detecting unit, further, detects a terminal point of an article lying in an advancing direction of said autonomous mobile robot apparatus, and a distance between said terminal point and said autonomous mobile robot apparatus, and said route producing unit, when said obstacle detecting unit detects the terminal end of said article, controls at least either one of the route and the velocity thereof, so as to avoid to collide on the obstacle, which rushes out from said terminal point, in the advancing direction of said autonomous mobile robot apparatus, centering around said terminal point, wherein said route producing unit determines a collision avoiding area by taking either one of a stop distance of said robot apparatus and an advancing distance of said obstacle up to stoppage of said robot apparatus when said obstacle rushes out, centering around said terminal point, and further decides a possibility of collision upon the obstacle rushing out from said terminal point, upon said collision avoiding area determined, wherein said route producing unit controls at least either one of the route and the velocity thereof, depending on the possibility of collision upon the obstacle rushing out from said terminal point determined upon basis of said collision avoiding, wherein said route producing unit decelerates said velocity when the velocity of said autonomous mobile robot apparatus can be decelerated, in case where there is the possibility of collision upon the obstacle rushing out from said terminal point, which is determined upon basis of said collision avoiding area, and causes said robot apparatus to make a detour to change the route as the route thereof where it is impossible to decelerate the velocity of said robot apparatus, wherein said route producing unit obtains the advancing distance of said obstacle up to stoppage of said robot apparatus when said obstacle rushes out, with multiplying an estimated maximum velocity of said obstacle by stop time of said robot apparatus.

2. The autonomous mobile robot apparatus, as described in the claim 1, wherein said route producing unit selects a route having an amount less in changes of the velocity to be controlled for avoiding the collision upon the obstacle, which rushes out from said terminal point, in case where there can be obtained a plural number of routes for reaching to the destination while avoiding said obstacle detected, when said obstacle detecting unit detects the obstacle and also said terminal end.

* * * * *